(12) United States Patent
Campbell

(10) Patent No.: US 11,137,028 B2
(45) Date of Patent: Oct. 5, 2021

(54) SLIDE BEARING ASSEMBLIES

(71) Applicant: Cascade Corporation, Fairview, OR (US)

(72) Inventor: Brian D. Campbell, Fairview, OR (US)

(73) Assignee: Cascade Corporation, Fairview, OR (US)

( * ) Notice: Subject to any disclaimer, the term of this patent is extended or adjusted under 35 U.S.C. 154(b) by 0 days.

(21) Appl. No.: 16/785,262

(22) Filed: Feb. 7, 2020

(65) Prior Publication Data

US 2020/0256384 A1 Aug. 13, 2020

Related U.S. Application Data

(60) Provisional application No. 62/802,329, filed on Feb. 7, 2019.

(51) Int. Cl.
| | |
|---|---|
| *F16C 33/20* | (2006.01) |
| *F16C 17/02* | (2006.01) |
| *F16C 29/02* | (2006.01) |

(52) U.S. Cl.
CPC ............ *F16C 33/208* (2013.01); *F16C 17/02* (2013.01); *F16C 29/02* (2013.01); *F16C 33/201* (2013.01);
(Continued)

(58) Field of Classification Search
CPC ........ F16C 17/02; F16C 29/02; F16C 33/201; F16C 33/208; F16C 2208/32; F16C 2208/36; F16C 2223/80
(Continued)

(56) References Cited

U.S. PATENT DOCUMENTS

| | | |
|---|---|---|
| 2,782,065 A | 2/1957 | Lord |
| 2,804,181 A | 8/1957 | Haynes |

(Continued)

FOREIGN PATENT DOCUMENTS

| | | |
|---|---|---|
| CA | 1299528 C | 4/1992 |
| CN | 207274194 U * | 4/2018 |

(Continued)

OTHER PUBLICATIONS

United States Patent and Trademark Office; International Search Report and Written Opinion dated Mar. 23, 2017 for International Application No. PCT/US2016/069514; 8 pages.
(Continued)

*Primary Examiner* — Marcus Charles
(74) *Attorney, Agent, or Firm* — Chernoff, Vilhauer, McClung & Stenzel, LLP

(57) ABSTRACT

Slide-bearing assemblies capable of enabling sliding of a load-carrying implement relative to a load-supporting structure, having first and second load-carrying surfaces, respectively, are disclosed. In one embodiment, the slide-bearing assembly includes substantially nonmetallic first and second elongate bearing elements extending in parallel to support the first load-carrying surface of the load-carrying implement slidably upon the load-supporting structure. One of the bearing elements being composed of multiple elongate pieces each shorter in length than a length of the other of the bearing elements. The slide-bearing assembly additionally includes a post that extends from a surface of each of the multiple elongate pieces, which is a surface that is opposed to the second load-carrying surface, each post is sized to fit in a respective recess of the second load-carrying surface. The slide-bearing assembly further includes at least one coating on the first load-carrying surface made of high-performance thermoplastic material(s).

10 Claims, 4 Drawing Sheets

(52) U.S. Cl.
CPC ...... *F16C 2208/32* (2013.01); *F16C 2223/80* (2013.01)

(58) Field of Classification Search
USPC ............................................ 384/26, 42, 300
See application file for complete search history.

(56) References Cited

U.S. PATENT DOCUMENTS

| | | | |
|---|---|---|---|
| 2,888,300 | A | 5/1959 | Curtis |
| 3,243,236 | A | 3/1966 | Graham |
| 3,252,743 | A | 5/1966 | Zapponi |
| 3,512,671 | A | 5/1970 | Morocco |
| 4,299,008 | A | 11/1981 | Burns |
| 4,335,992 | A | 6/1982 | Reeves |
| 4,442,922 | A * | 4/1984 | Johannson ................ B66F 9/08 187/238 |
| 4,509,870 | A | 4/1985 | Taki |
| 4,647,226 | A | 3/1987 | Mottate |
| 4,712,927 | A * | 12/1987 | Arrendiell ............... A47B 88/49 384/23 |
| 4,773,769 | A * | 9/1988 | Church .................. F16C 29/02 384/40 |
| 5,192,189 | A | 3/1993 | Murata |
| 5,199,533 | A | 4/1993 | Wilke |
| 5,374,126 | A | 12/1994 | Akasako et al. |
| 5,707,201 | A | 1/1998 | Hamlik |
| 5,807,060 | A | 9/1998 | Hamlik |
| 5,820,270 | A | 10/1998 | Richardson |
| 6,036,429 | A | 3/2000 | Johnson |
| 6,056,499 | A | 5/2000 | Bressner |
| 6,158,123 | A * | 12/2000 | Bryson .................. B23P 15/00 29/434 |
| 6,227,352 | B1 | 5/2001 | Johnson |
| 6,257,766 | B1 | 7/2001 | Agar |
| 7,653,966 | B2 * | 2/2010 | Quinn ................. E05D 15/0652 16/96 R |
| 8,104,962 | B2 | 1/2012 | Niedermeyer |
| 9,061,871 | B2 | 6/2015 | Miwa et al. |
| 9,616,283 | B1 * | 4/2017 | Heineck ................ A61H 1/024 |
| 10,094,421 | B2 * | 10/2018 | Yen ....................... F16C 33/201 |
| 10,550,886 | B2 | 2/2020 | Sweeney et al. |
| 2002/0021030 | A1 | 2/2002 | Hermsen et al. |
| 2003/0049485 | A1 * | 3/2003 | Brupbacher .............. C23C 4/18 428/615 |
| 2013/0048807 | A1 | 2/2013 | Roberts |
| 2014/0321778 | A1 | 10/2014 | Buchmann |
| 2015/0323005 | A1 | 11/2015 | Villemagne et al. |
| 2016/0039640 | A1 * | 2/2016 | Martin ................... B66B 11/08 187/254 |
| 2018/0017108 | A1 | 1/2018 | Sweeney et al. |

FOREIGN PATENT DOCUMENTS

| | | | | |
|---|---|---|---|---|
| CN | 207855367 | U | * | 9/2018 |
| CN | 108907302 | A | * | 11/2018 |
| CN | 209982110 | U | * | 1/2020 |
| DE | 3801101 | A1 | | 7/1989 |
| EP | 2612836 | A1 | | 7/2013 |
| JP | 2012149612 | A | * | 8/2012 |
| JP | 2013204807 | A | * | 10/2013 |
| KR | 20100137718 | A | * | 12/2010 |
| WO | WO-2019177463 | A1 | * | 9/2019 ........... B65G 25/065 |

OTHER PUBLICATIONS

United States Patent and Trademark Office; International Search Report and Written Opinion dated May 7, 2017 for International Application No. PCT/US2020/017305; 8 pages.

* cited by examiner

SLIDE BEARING ASSEMBLIES

CROSS-REFERENCE TO RELATED APPLICATIONS

This application claims the benefit of U.S. Provisional Patent Application Ser. No. 62/802,329 filed on Feb. 7, 2019 and entitled HIGH PERFORMANCE THERMOPLASTIC BEARING MATERIALS. The complete disclosure of the above application is hereby incorporated by reference for all purposes.

BACKGROUND OF THE INVENTION

The subject matter of this application relates to a slide bearing assembly useable with a load-handling or carrying system and a corresponding load-supporting structure, such as used with a lift truck. The combination of a load-handling system and a load-supporting structure often includes surfaces that continuously slide against one another. Continuous movement leads to wear and damage to the interface parts, thus requiring frequent repair or replacement of expensive parts. Depending on the materials present at the interface, such movement may also create enhanced frictional heat at the interface which can cause damage to other non-heat-resistant components, and also may require increased energy output from the lift truck to create movement at the interface.

Nonmetallic materials, such as nylon, have been used as bearings where only a single bearing is attached to one moving surface, thereby leaving the opposing surface exposed. With the use of only a single nonmetallic bearing, the single bearing normally slides against a steel surface of the opposing load carrying component, causing a high rate of wear.

Conversely, as will be discussed in detail herein, the use of coatings made of high-performance thermoplastic bearing materials on the exposed opposing surface results in lower wear and lower forces required to move a load and thereby reduce the energy consumption of the operation.

SUMMARY OF THE INVENTION

In one embodiment, the invention described herein may include a slide-bearing assembly capable of enabling sliding of a load-carrying implement relative to a load-supporting structure, such that the slide-bearing assembly includes substantially nonmetallic first and second opposing elongate bearing elements capable of extending in parallel and at least one coating on the first load-carrying surface made of one or more high-performance thermoplastic materials to support the load-carrying implement slidably upon the load-supporting structure. The embodiment may be advantageously constructed so that one of the bearing elements is composed of multiple elongate pieces, each shorter in length than the length of the other of the bearing elements.

In another embodiment, the invention described herein may include a slide-bearing assembly capable of enabling sliding of a load-carrying surface relative to a load-supporting structure, such that the slide-bearing assembly may include a first arrangement of at least two substantially nonmetallic elongate bearing elements capable of extending longitudinally in series along a second load-carrying surface parallel to the first load-carrying surface. The at least two substantially non-metallic elongate bearing elements are affixed on the second load-carrying surface via at least one post extending through the second load carrying surface. Additionally, at least one coating on the first load-carrying surface is made of one or more high-performance thermoplastic materials.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
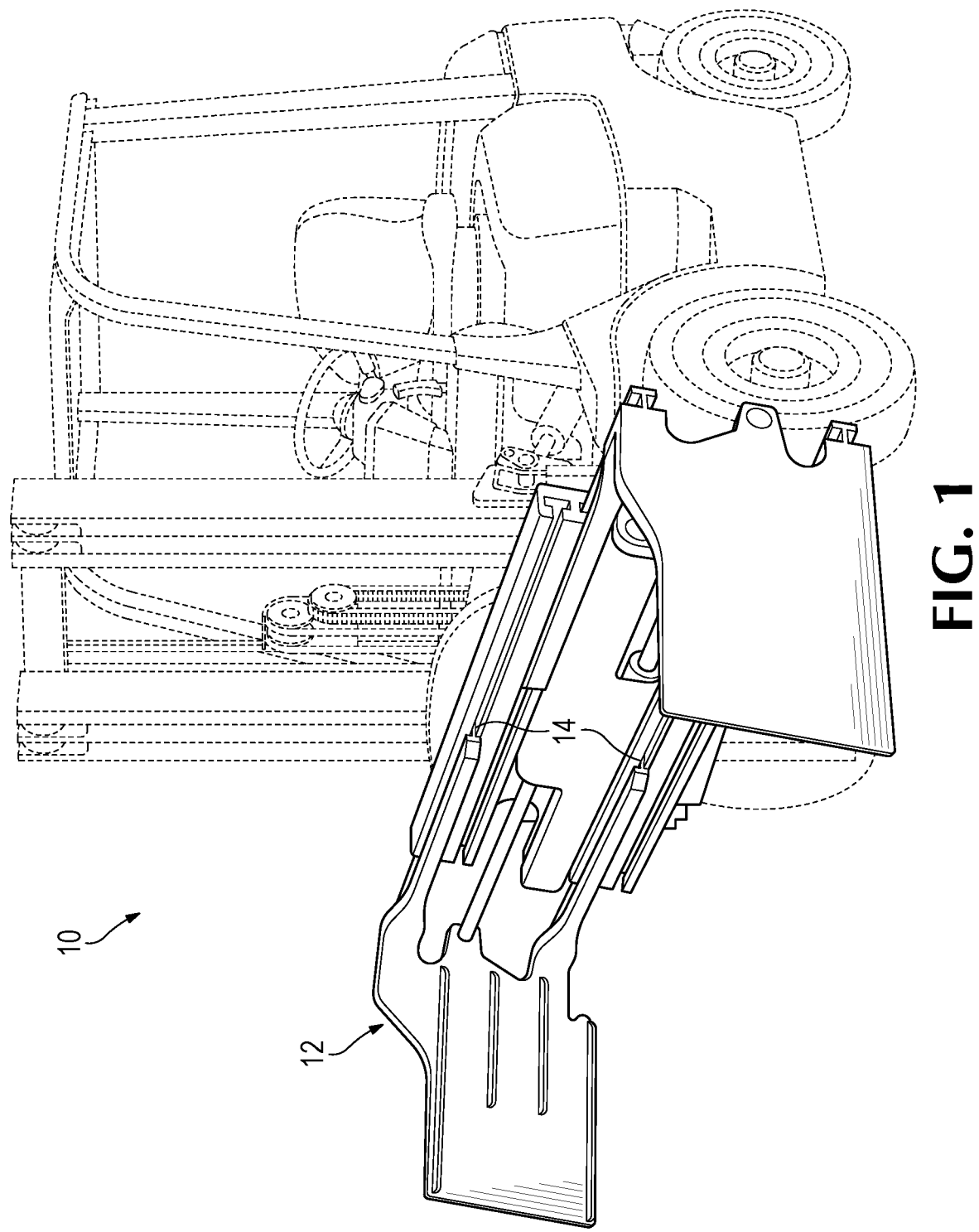
FIG. 1 is an isometric view of a lift truck having an example of sliding arm clamps.
Figure 2:
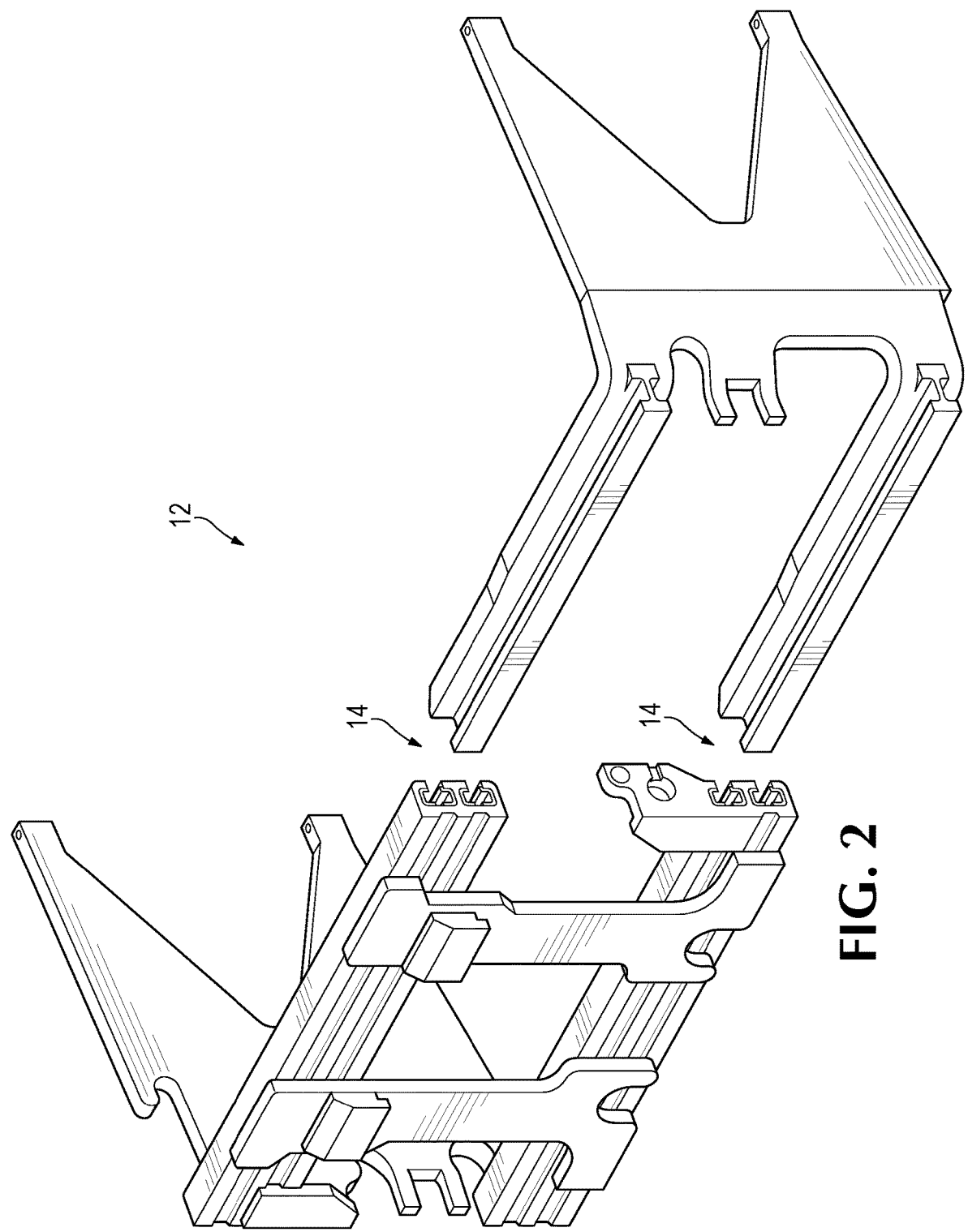
FIG. 2 is an isometric view of the sliding arm clamps of FIG. 1 having an example of a slide-bearing assembly
Figure 4:
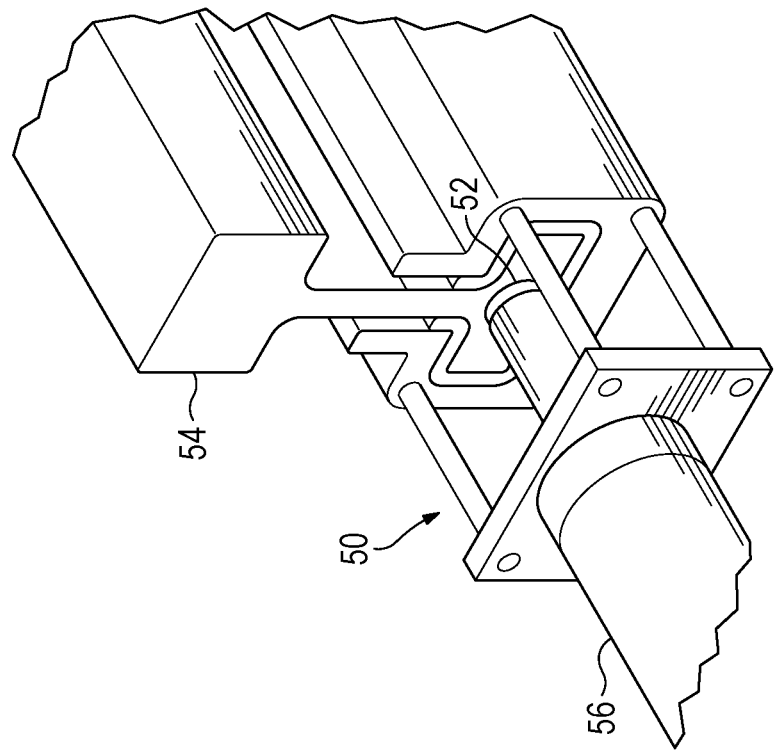
FIG. 4 is a partial isometric view of an example of testing equipment.

Referring now to the drawings which form a part of the disclosure herein, FIGS. 1-2 are isometric views of a lift truck 10 having sliding arm clamps 12 with a slide-bearing assembly 14. Although a lift truck having sliding arm clamps are shown, the slide-bearing assembly of the present disclosure may alternatively, or additionally, be incorporated or used with fork positioners, load stabilizers, sideshifters, layer pickers, and other similar attachments/equipment in which one or more portions (such as arm bars, rods, etc.) that are movably or slidably received in one or more other portions (such as channels, sleeves, etc.).

Figure 3:
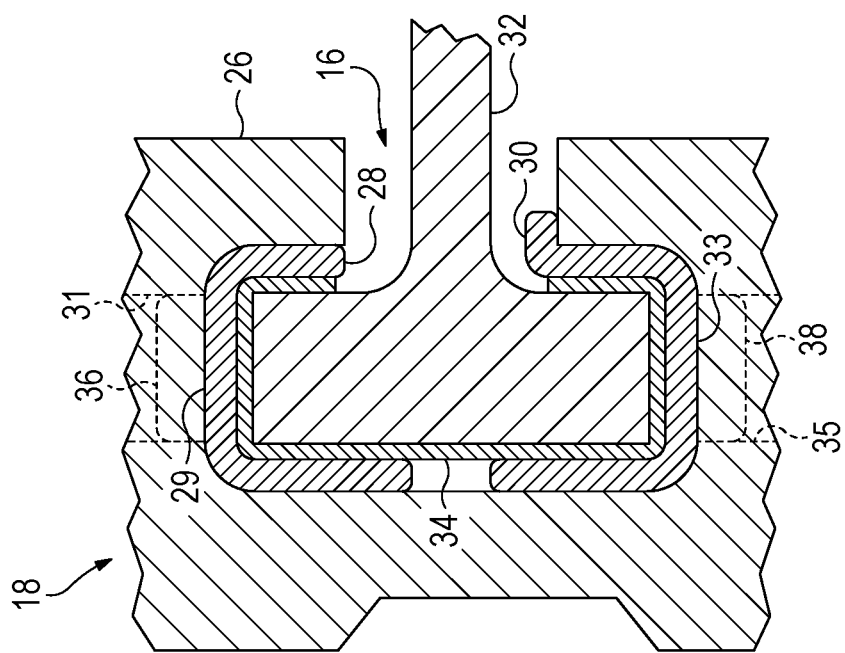
FIG. 3 is a sectional view of the sliding arm clamps showing the slide-bearing assembly of FIGS. 1-2.

Referring to FIG. 3 show a sectional view of a slide-bearing assembly 16 for arm assembly 18 for translating arms or carriers. The slide-bearing assembly may be the same for both upper and lower arms, or may be different from each other. In the example shown in FIGS. 1-3, slide-bearing assembly 16 is identical for both the upper and lower arms so only a single C-channel is shown in FIG. 3. Primary C-channel bearings 28 are attached to a load carrying surface of C-channel 26. Secondary C-channel bearings 30 are attached to the load carrying surface of C-channel 26 as well. Partially encompassed by C-channel 26 is a translating T-bar 32. At least one coating 34 is applied to the load carrying surface of T-bar 32. T-bar 32 does not include (or excludes) any bearings attached to any or all of its load carrying surfaces. Although slide-bearing assembly 16 is shown to include primary C-channel bearings 28 separate from secondary C-channel bearing 30, other examples of slide-bearing assembly may include unitary C-channel bearings in which the primary C-channel bearing and second C-channel bearing are formed as a unitary piece (e.g., primary C-channel bearing 28 and secondary C-channel bearing 30 are connected along the left side of FIG. 3).

Primary C-channel bearings 28 and secondary C-channel bearings 30 also may include posts 36, 38 that extend out of bearings 28, 30 into corresponding spaces in the load-carrying surface of C-channel 26, as shown in FIG. 3. For example, post 36 extends from a surface 29 of bearing 28 and is sized to fit in a respective recess 31. Similarly, post 38 extends from a surface 33 of bearing 30 and is sized to fit in a respective recess 35. The posts may be formed with bearings 28, 30 (or with the unitary C-channel bearings), or may be attached to those bearing(s) (e.g., via press fit plugs). In one illustrative embodiment, primary C-channel bearing 28 may be approximately 334 millimeters. Two primary C-channel bearings 28 may be secured to C-channel 26 in a transverse direction. Secondary C-channel bearing 30 may also be approximately 334 millimeters. Two secondary C-channel bearings 30 may be secured to C-channel 26 in series or in a transverse direction. In other embodiments, the bearings described herein may be of other lengths. The other dimensions of the bearings, such as the depth and width, may be selected based on manufacturer specification.

Coating 34 may include one or more high-performance thermoplastic materials, which may be applied via any suitable mechanisms. The surface roughness of the armbars, rods, and other components may be increased prior to applying coating(s) 34, such as via grit blasting or shot blasting. In one example, coating(s) 34 are spray applied to armbars, rods, and other components (e.g., T-bars 32) that are movably or slidably received in one or more other parts (e.g., C-channels 26), and then the coating(s) are baked. In one embodiment, an air spray gun with a siphon cup or pressure pot is used to spray the high-performance thermoplastic bearing material to a uniform, full wet appearance, such as at room temperature (e.g., 18-32° C./65-90° C.). The material is then baked to flash off the solvent in the material, such as at about 125 to about 175° C. for about 10 minutes.

Alternatively, coating(s) 34 may be applied as an electrostatic powder coat, which may reduce over spray and improve material costs due to higher coating efficiency. As such, in one embodiment, the armbars, rods, and other components (e.g., T-bar(s) 32) are heated up in an oven, such as about 716° F. to about 752° F. or about 752° F. to about 788° F. The coating(s) are then applied to the hot component(s). Alternatively, the electrostatic powder coating is applied to the arm bars, rods, and other components (e.g., T-bars 32) cold, and then subsequent coatings are hot flocked (i.e., heated and then immediately spraying the electrostatic powder). When the powder has melted and flowed out, the components are taken out of the oven and either left to cool or another coating hot flocked on top of the previous coating. Two or more coatings are typically applied.

When a high-performance thermoplastic material is applied to armbars, rods, and other components, the material acts as "applied bearings" to facilitate their movement relative to the other parts and reduce friction, particularly when the other parts include plastic bearings, such as ultra-high molecular weight (UHMW) bearings. In other words, the movement is facilitated and the friction is reduced by having applied bearings interacting with the plastic bearings.

Such assembly embodiments may have load bearing surfaces with multiple shorter bearing sections positioned in series, along the width of a load-supporting structure such as a side shifter, in slidable contact with a longer bearing section. An advantage of having multiple shorter bearings is that a manufacturer may accommodate a wide range of side shifter widths by using multiples of the small support bearings. The lengths of the bearings may be selected so that the bearing lengths manufactured accommodate the widths of a variety of frame widths, thereby avoiding the need to manufacture new bearings at different lengths for each different frame width. Therefore, a manufacturer would be able to reduce the number of unique bearings it would need to produce.

In one embodiment of the invention, the bearings (e.g., 28 and 30, or unitary C-channel bearings) may have chamfered ends. Chamfered ends may be beneficial in such assemblies 16 by minimizing the potential of non-chamfered or otherwise cornered ends from one bearing getting caught with an end of another bearing during use. In some embodiments of the present invention, the bearings are substantially non-metallic. In some embodiments, the stationary bearings are nylon 6/6, 10% Aramid Fiber, 15% PTFE. In some embodiments, the translating bearings are nylon 6/6, 30% carbon fiber, 15% PTFE. Such bearings may also be made out of ceramic materials. Although arm bars of a sliding clamp are shown in several of the above figures, the coatings with one or more high-performance thermoplastic materials of the present disclosure may be used on any moving or sliding component(s) of any attachment/equipment to facilitate their movement and reduce friction.

Figure 5:
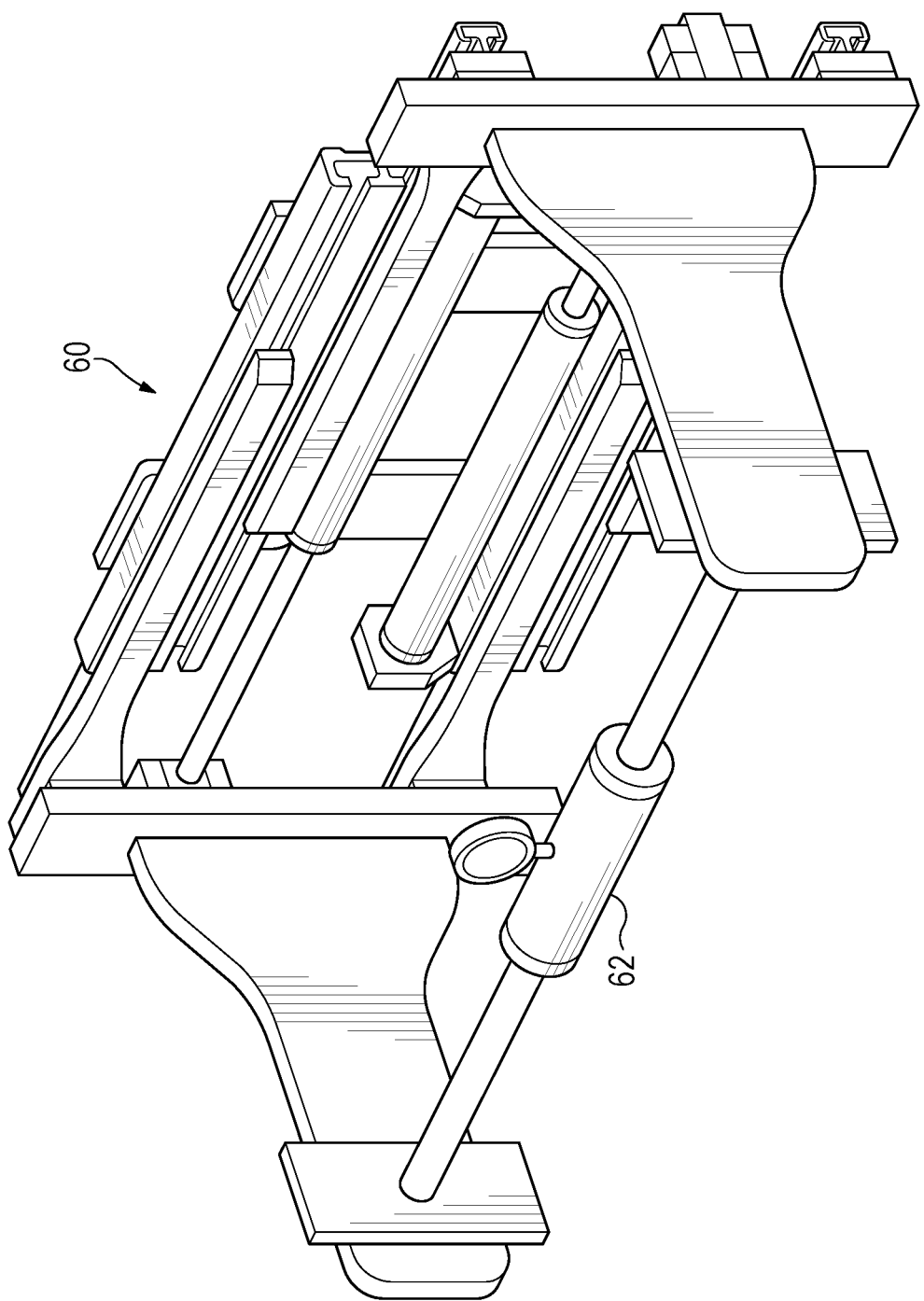
FIG. 5 is an isometric view of another example of testing equipment.

Referring to FIG. 5, testing equipment 50 that was used to select high-performance thermoplastic bearing material. Testing equipment 50 includes a load cell 52 to measure force necessary to initiate motion (or coefficient of friction) of a coated armbar 54 via a cylinder 56. Referring to FIG. 6, testing equipment 60 is shown to test coated arm bars at different clamping forces. Testing equipment 60 includes a clamp force assembly 62 that is placed between sliding arm clamps to measure the clamping force of those clamps. Based on previous testing performed via testing equipment 50, suitable and preferred coatings for coating(s) 34 include thin dense chrome coatings and/or high pressure and/or high temperature coatings that include one or more of polyphenylene sulphide (PPS), polytetrafluoroethylene (PTFE), and/or polyetheretherketone (PEEK).

The slide-bearing assembly of the present disclosure provides a high-performance thermoplastic bearing material solution for the armbars and other moving components of sliding clamps, fork positioners, load stabilizers, and other attachments/equipment. This solution reduces friction, leading to greater efficiency and decreased energy consumption. This solution also increases product life. When used with a moving clamp, the solution provides more consistent clamping performance over time. Additionally, this solution reduces maintenance by eliminating the necessity for reapplying topical lubricants to maintain performance. Moreover, this solution provides corrosion protection to maintain long-term efficiency and appearance. Furthermore, this solution reduces material costs by eliminating the secondary processing required to achieve the current surface finish. Additionally, this solution involves materials that are water based and/or have low volatile organic compounds (VOCs). Moreover, this solution reduces processing of the surfaces for the armbars and other moving components prior to applying the coating(s). For example, the surfaces of those armbars and other moving components can have more surface roughness and/or waviness prior to applying the coating(s) as compared to when no coating(s) are applied.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A slide-bearing assembly capable of enabling sliding of a load-carrying implement relative to a load-supporting structure, having a first and a second load-carrying surface, respectively, the slide-bearing assembly comprising:
   (a) a first elongate bearing element and a second elongate bearing element extending in parallel to support the first load-carrying surface of the load-carrying implement slidably upon the load-supporting structure, the first and second elongate bearing elements being nonmetallic;
   (b) one of the bearing elements being composed of multiple elongate pieces each shorter in length than a length of the other of the bearing elements;
   (c) a post that extends from a surface of each of the multiple elongate pieces, the surface being a surface that is opposed to the second load-carrying surface, each post is sized to fit in a respective recess of the second load-carrying surface; and
   (d) at least one coating on the first load-carrying surface and directly contacting the first load-carrying surface, the at least one coating made of one or more high-performance thermoplastic materials.

2. The slide-bearing assembly of claim 1, wherein the at least one coating is spray applied onto the first load-carrying surface and then baked on the first load-carrying surface.

3. The slide-bearing assembly of claim 1, wherein the at least one coating is applied as an electrostatic powder coat and then hot flocked.

4. The slide-bearing assembly of claim 1, wherein the at least one coating includes a thin dense chrome coating.

5. The slide-bearing assembly of claim 1, wherein the at least one coating includes one or more of polyphenylene sulfide (PPS), polytetrafluoroethylene (PTFE), or polyetheretherketone (PEEK).

6. A slide-bearing assembly capable of enabling sliding of a load-carrying implement relative to a load-supporting structure, having a first and a second load-carrying surface, respectively, the slide bearing assembly comprising:
   (a) a first arrangement of at least two nonmetallic elongate bearing elements extending longitudinally in series along the second load-carrying surface parallel to the first load-carrying surface, the at least two nonmetallic elongate bearing elements are affixed on the second load-carrying surface via at least one post extending through the second load carrying surface; and
   (b) at least one coating on the first load-carrying surface and directly contacting the first load-carrying surface, the at least one coating made of one or more high-performance thermoplastic materials.

7. The slide-bearing assembly of claim 6, wherein the at least one coating is spray applied onto the first load-carrying surface and then baked on the first load-carrying surface.

8. The slide-bearing assembly of claim 6, wherein the at least one coating is applied as an electrostatic powder coat and then hot flocked.

9. The slide-bearing assembly of claim 6, wherein the at least one coating includes a thin dense chrome coating.

10. The slide-bearing assembly of claim 6, wherein the at least one coating includes one or more of polyphenylene sulfide (PPS), polytetrafluoroethylene (PTFE), or polyetheretherketone (PEEK).

* * * * *